United States Patent [19]
Zimmerman et al.

[11] Patent Number: 5,001,638

[45] Date of Patent: Mar. 19, 1991

[54] INTEGRATED AIRCRAFT AIR DATA SYSTEM

[75] Inventors: Ward H. Zimmerman, Seattle; Melville D. W. McIntyre, Bellevue, both of Wash.

[73] Assignee: The Boeing Company, Seattle, Wash.

[21] Appl. No.: 339,675

[22] Filed: Apr. 18, 1989

[51] Int. Cl.$^5$ ............... B06F 7/70; B06F 15/48; B06F 15/50; G06G 7/00

[52] U.S. Cl. ............ 364/424.06; 364/424.01; 364/431.04; 371/8.1; 371/67.1; 244/76 R; 244/194

[58] Field of Search ............ 364/424.06, 434, 131, 364/137, 433, 424.01, 431.01, 431.02, 431.04; 371/7, 11.2, 11.3, 67.1, 68.1–68.3, 8.1; 244/75 R, 76 R, 194

[56] References Cited

U.S. PATENT DOCUMENTS

| | | | |
|---|---|---|---|
| 2,737,015 | 3/1956 | Wright | 60/35.6 |
| 2,961,200 | 11/1960 | Seliger et al. | 244/77 |
| 3,132,244 | 5/1964 | Kemmer et al. | 364/424.06 X |
| 3,135,861 | 6/1964 | Burggren et al. | 364/424.06 X |
| 3,174,284 | 3/1965 | McCarthy | 60/39.16 |
| 3,299,630 | 1/1967 | Alper | 60/39.15 |
| 3,686,485 | 8/1972 | Wiley et al. | 235/150.2 |
| 3,875,390 | 4/1975 | Eccles et al. | 235/153 AE |
| 4,032,757 | 6/1977 | Eccles | 235/150.2 |
| 4,038,526 | 7/1977 | Eccles et al. | 235/150.1 |
| 4,056,732 | 11/1977 | Martin | 307/33 |
| 4,115,847 | 9/1978 | Osder et al. | 364/101 |
| 4,296,601 | 10/1981 | Martin | 60/224 |
| 4,303,976 | 12/1981 | Joby | 364/431 |
| 4,410,948 | 10/1983 | Doniger et al. | 364/431.01 |
| 4,785,403 | 11/1988 | Kuhlberg | 364/424.06 |
| 4,845,495 | 7/1989 | Bollard et al. | 364/424.06 X |

OTHER PUBLICATIONS

Hopkins, Jr. et al., "FTMP–A Highly Reliable Fault-Tolerant Multiprocessor for Aircraft", IEEE Proceedings, vol. 66, Oct. 1978.

Primary Examiner—Parshotam S. Lall
Assistant Examiner—Edward J. Pipala
Attorney, Agent, or Firm—Christensen, O'Connor, Johnson & Kindness

[57] ABSTRACT

An integrated air data system for use on an aircraft. Airframe air data units (18) are connected to receive a plurality of redundant total pressure sensor inputs (20,22,24), a plurality of redundant static pressure sensor inputs (26,28,30), and a total temperature sensor input (32). Similar redundant sensor inputs are provided a first and second channel in each of two electronic engine controls (34,36). Bidirectional data buses (16) connect the airframe air data system to the electronic engine control system, so that the same sensor signals are available for each of the systems. The airframe air data unit and the primary electronic engine control channel having priority to control each engine are independently operative to select a preferred total pressure, static pressure, and total temperature value according to a common programmed logic scheme. The selection logic gives priority to the use of the same value for common parameters in each of the systems, where possible. The logic also minimizes the risk that failure of a single sensor may result in use of an incorrect value for a parameter, and that any combination of failures of different sensors, except for similar failures occurring independently on each engine, might result in an undesired effect on more than one engine.

22 Claims, 10 Drawing Sheets

INTEGRATED AIRCRAFT AIR DATA SYSTEM

TECHNICAL FIELD

The present invention pertains to air data systems used on aircraft to provide air pressure and temperature data for cockpit instrumentation and for controlling aircraft engines.

BACKGROUND OF THE INVENTION

Commercial aircraft typically include a plurality of air data systems for monitoring certain critical parameters used in controlling the aircraft. In the conventional arrangement, separate air data systems are provided for the airframe (i.e., cockpit instrumentation) and the electronic engine controls. The airframe air data system drives cockpit displays related to the navigation and flight condition of the aircraft, e.g., indicating altitude, rate of climb, air speed, and Mach number; the electronic engine controls use similar sensor data to regulate the air/fuel ratio and other variables affecting the engines. To insure fail-safe operation of the aircraft, redundant total pressure, total temperature, and static pressure sensors are provided for each air data system and each electronic engine control system.

Sensors for the airframe air data system are normally disposed on or in the fuselage of the aircraft, while those that service the electronic engine control systems are disposed in each engine pod. Although the engine and airframe air data systems monitor the same parameters in prior art designs, there is typically no communication of data between each of the discrete air data systems, nor any attempt to select a single best value of any of the common parameters for use by all air data systems on the aircraft.

In the past, aircraft design engineers have been reluctant to combine the various air data systems into an integrated system, due to the need to maintain independent fault accommodation in each engine. A guiding principle applied in designing critical aircraft systems is that no single failure of a component should result in any undesired effect on more than one engine. However, there are significant advantages in using common air data for the airframe and the electronic engine control systems. For example, if the same air data are used, the thrust ratings computed by the cockpit flight management system will agree with those determined by each of the electronic engine control systems, and the performance of the engines will be more accurately matched to each other. Often, in conventional designs, there are significant variations between common parameters separately determined by each system. Perhaps more importantly, communication of data between the various air data systems is likely to provide an even more effective fail-safe system than the conventional approach by increasing the level of sensor redundancy.

These and other objects and advantages of the present invention will be apparent from the attached drawings and the Description of the Preferred Embodiment that follows.

SUMMARY OF THE INVENTION

On an aircraft, an integrated air data system is provided that comprises a plurality of first and second sensors. The first sensors are associated with an airframe air data unit and are each operative to provide a signal indicative of a parameter used by the airframe air data unit to determine the flight status of the aircraft. Similarly, the second sensors, which are associated with an engine control system, each provide a signal indicative of a parameter used by the engine control system to control the operation of the aircraft engine, and these signals are redundant to the signals provided by the first sensors, since the same parameters are sensed by at least one each of the first and second sensors.

A bidirectional data bus connects the airframe air data unit to the engine control system, conveying data therebetween. Disposed within the airframe air data unit and the engine control system are control means that are connected to the data bus. The control means are operative to select at least one of the redundant signals provided by the first and second sensors as a preferred signal for use by the airframe air data unit and by the engine control system according to a predetermined logic. In following the predetermined logic, priority is given to using the same signal for both the airframe air data unit and the engine control system, and to minimizing the effect of a failure of any one or more of the first and second sensors.

The first sensors include a plurality of total pressure sensors, a plurality of static pressure sensors, and a total temperature sensor, while the second sensors comprise a plurality of total pressure sensors, static pressure sensors, and total temperature sensors. The engine control system for each engine on the aircraft includes a first and a second channel, and each channel includes nominal inputs from at least one each of the total pressure, static pressure, and total temperature sensors comprising the second sensors. One of the channels of each engine has priority to control that engine in response to the selected signals.

Since the total pressure and the static pressure sensors comprising the first sensors are more accurate than the corresponding second sensors, the predetermined logic gives preference to selecting signals provided by the former. Similarly, the predetermined logic gives preference to selecting one of the signals provided by the total temperature sensors comprising the second sensors, rather than the total temperature sensor comprising the first sensors, when the engine is operating.

In selecting which of the corresponding redundant signals indicative, respectively, of total pressure, static pressure, and total temperature will be used by the airframe air data unit and by the engine control system, the control means are further operative to determine differences between selected redundant signals for comparison to predefined values. By avoiding use of redundant signals that deviate significantly from the other signals, the control means minimize the risk that an erroneous signal will be used by all engines. It should thus be apparent that failure of any one sensor cannot adversely affect more than one engine, and the effects of simultaneous or sequential failure of more than one sensor are minimized.

DESCRIPTION OF THE PREFERRED EMBODIMENT

Figure 1:
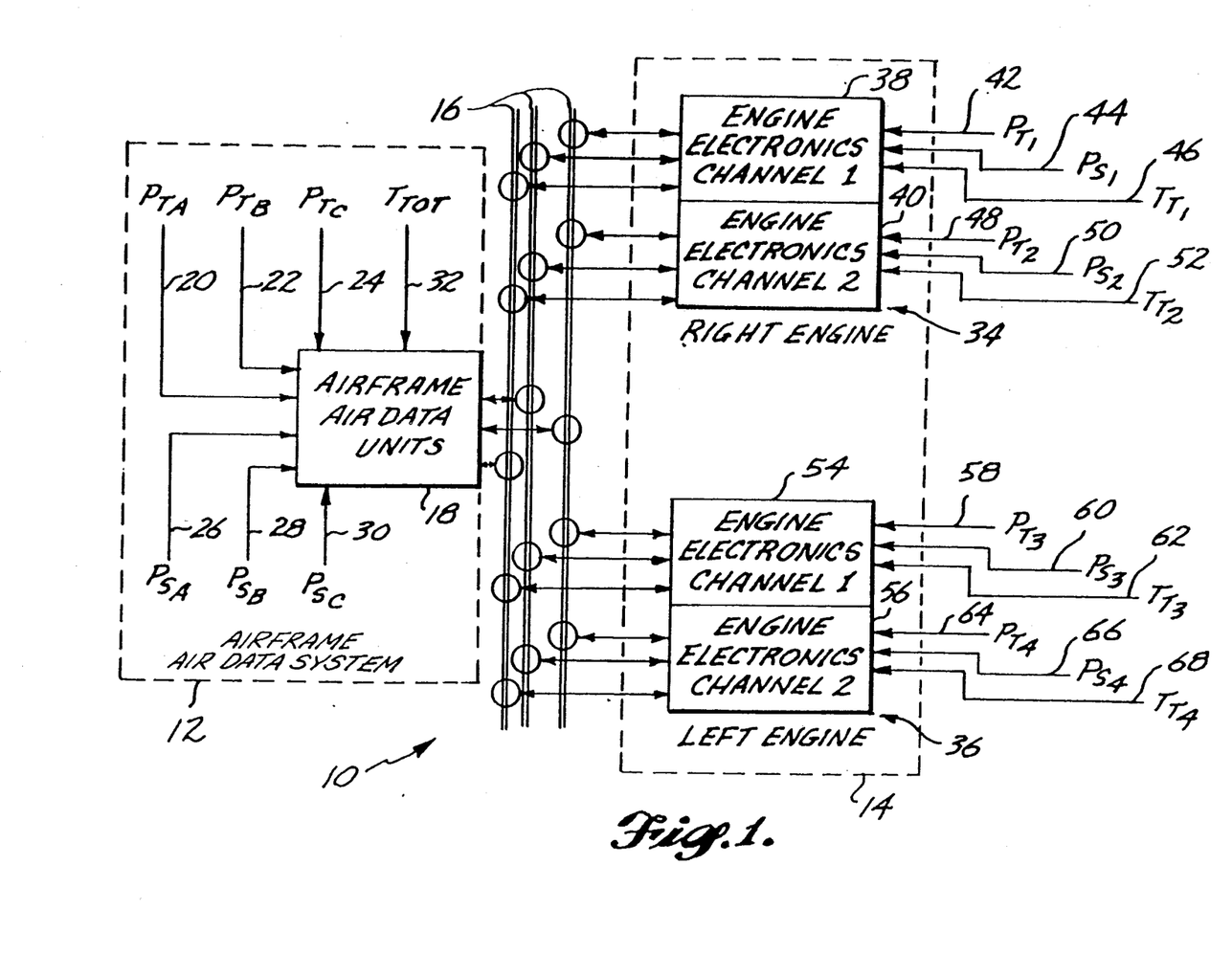
FIG. 1 is a schematic block diagram illustrating the integrated air data system of the present invention.

In FIG. 1, an integrated air data system for use on an aircraft is indicated generally at reference numeral 10. The term "integrated" is used here to describe an air data system in which an airframe air data system 12 and electronic engine control systems 14 are connected in a single system through bidirectional data buses 16. Bidirectional data buses 16 provide redundant paths for the interchange of air data between airframe air data system 12 and electronic engine controls 14 so that common data are used when possible. Integrated air data system 10 is nevertheless provided with a relatively high degree of redundancy to ensure safety in the operation of the aircraft.

Airframe air data subsystem 12 includes redundant airframe air data units 18, which are connected to flight instruments in the cockpit of the aircraft (not shown). These instruments provide information to the crew concerning airspeed, altitude, rate of descent, Mach number, and other data relating to the flight condition of the aircraft. To support the cockpit flight instruments, redundant airframe air data units 18 are provided with inputs from a plurality of sensors, including three total pressure sensor inputs 20, 22, and 24; three static pressure sensor inputs 26, 28, and 30; and a total temperature sensor input 32. To better illustrate their association with redundant airframe air data units 18, these sensors are shown as if connected directly to the airframe air data units; in fact, the sensors are connected to the airframe air data system through bidirectional data buses 16.

As used herein, the term "total pressure" refers to the pressure measured by a forward pointing Pitot tube (not shown) and comprises the sum of the local ambient barometric pressure and the impact pressure caused by the the forward motion of the aircraft relative to the air mass through which it is moving. In comparison, static pressure is simply the local or ambient barometric pressure around the aircraft. Total temperature is a kinetic temperature since it is affected by the velocity of the aircraft; however, at low aircraft velocity, the total temperature is substantially equal to the local ambient air temperature.

Use of redundant total pressure and redundant static pressure sensors greatly reduces the risk of total airframe air data system failure, should one or two of the total or static pressure sensors fail to operate properly. In the preferred embodiment, only one total temperature sensor input is associated with redundant airframe air data units 18, since total temperature data are also provided by the electronic engine controls over bidirectional data buses 16, as described below.

To simplify the explanation of the integrated air data system and its operation, it is disclosed as being installed on an aircraft that has only a left and a right engine (neither shown); however, it should be understood that the present invention can also be used on aircraft having other engine configurations. Operation of the right engine of the representative aircraft is controlled by an electronic engine control system 34, while operation of the left engine is controlled by an electronic engine control system 36. Each of the electronic engine control systems is split into two redundant channels, (1) and (2), represented in FIG. 1 at reference numerals 38 and 40 (with respect to the right engine), and at reference numerals 54 and 56 (with respect to the left engine). Right engine channel (1) 38 includes a total pressure sensor input 42, a static pressure sensor input 44, and a total temperature sensor input 46. Right engine channel (2) 40 similarly includes a total pressure sensor input 48, a static pressure sensor input 50, and a total temperature sensor input 52.

For electronic engine control system 36, channel (1) includes a total pressure sensor input 58, a static pressure sensor input 60, and a total temperature sensor input 62; and channel (2) includes a total pressure sensor input 64, a static pressure sensor input 66, and a total temperature sensor input 68. Since channels (1) and (2) of both the left and right electronic engine control systems are mutually redundant, it is appropriate that each is provided with the same input data from redundant total pressure, static pressure, and total temperature sensors to insure safe operation of the aircraft in the event that one of the sensors should fail. As mentioned above, interconnection of electronic engine control systems 34 and 36 to airframe air data units 18 and to each other through redundant bidirectional data buses 16 provides further levels of redundancy and thus, additionally enhances the safe operation of the aircraft.

Figure 2:
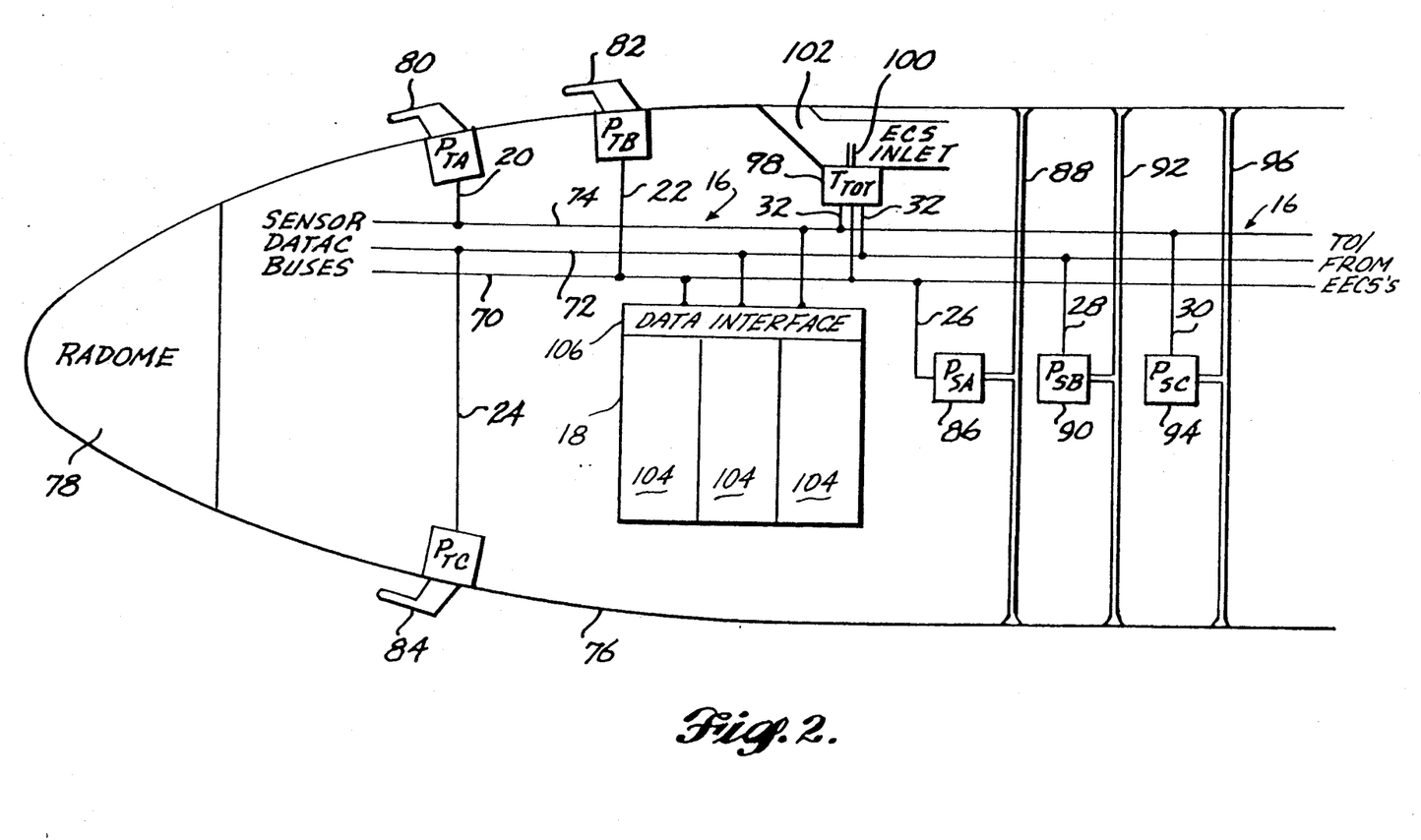
FIG. 2 is a block diagram showing the disposition of air data sensors connected to an airframe air data unit.

Referring now to FIG. 2, a schematic top view of an aircraft fuselage 76 is used to illustrate the relative disposition of the redundant total pressure, redundant static pressure, and the total temperature sensors, which provide data directly to redundant airframe air data units 18. Although each of these sensors can be directly connected to airframe air data units 18, in FIG. 2, the sensors are instead connected to the airframe air data unit through redundant bidirectional data buses 16, which comprise sensor DATAC buses 70, 72, and 74. (DATAC is an acronym for Digital Autonomous Terminal Access Communication.) The sensor DATAC buses provide a more efficient and fail-safe mechanism for conveying signals from each of the sensors to redundant airframe air data units 18 (and to the electronic engine control systems), since each of the redundant sensors are connected to all of the airframe air data units 18 by a separate sensor DATAC bus. For example, signals from a total pressure sensor 80 are carried by sensor DATAC bus 74, while signals from total pressure sensors 82 and 84 are respectively carried by sensor DATAC buses 70 and 72.

A static pressure sensor 86 is connected to a lateral passage 88 that extends from one side of the aircraft to the other, open to outside ambient air pressure on each side of aircraft fuselage 76. Data signals from static pressure sensor 86 are conveyed over sensor DATAC bus 70 to airframe air data unit 18. In the same manner, static pressure sensors 90 and 94 are respectively connected in fluid communication with lateral passages 92 and 96, and are operative to sense the average static or ambient pressure on each side of aircraft fuselage 76, producing signals that are input to the airframe air data unit over sensor DATAC buses 72 and 74. Lateral passages 88, 92, and 96 are open to each side of the aircraft fuselage to compensate for local differences in static pressure resulting from asymmetrical airflow around the aircraft fuselage during flight maneuvers.

A total temperature sensor 98 includes a probe 100 disposed within an inlet 102 of an environmental conditioning system (not shown) that is used to pressurize and temperature condition air supplied to the interior of the aircraft. Since probe 100 is not exposed to radiant heating from the sun or to other external temperature sources, its disposition within inlet 102 ensures that it accurately measures ambient air temperature when the aircraft is stationary and the air conditioning system is running. Signals from total temperature sensor 98 are supplied to sensor DATAC buses 70, 72, and 74 through redundant inputs 32, ensuring that loss of one of the sensor DATAC buses will not interrupt data input to airframe air data units 18 from the total temperature sensor.

Airframe air data units 18 comprise three processors 104, which are each supplied data from the sensor DATAC buses through a data interface 106. The data interface internally connects the data signals from each sensor to each processor 104, so that the processors can all access the same data in parallel relationship.

Figure 3A:
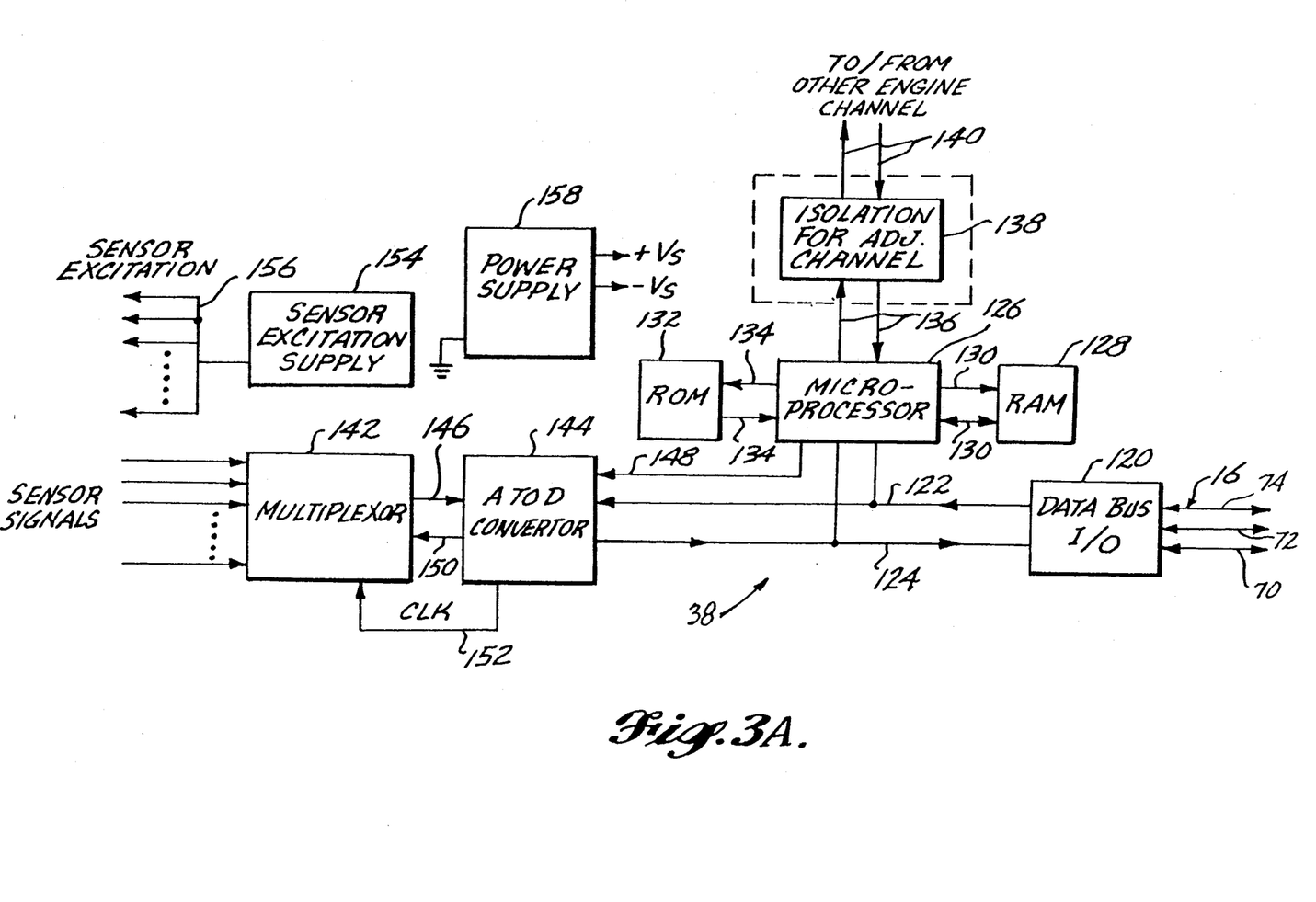
FIG. 3A is a schematic block diagram of the air data system control for one channel of an aircraft engine.

The block diagram shown in FIG. 3A illustrates, in an exemplary fashion, the internal structure of electronic engine control channel (1) 38, and is identical in structure to the other EECS channels 40, 54, and 56. A data bus I/O circuit 120 provides isolation between bidirectional data buses 16 and a microprocessor 126. Lines 122 and 124 connect data bus I/O circuit 120 to microprocessor 126, line 122 serving to convey data input from the bidirectional data buses to the microprocessor, while line 124 conveys data from the microprocessor for output over the bidirectional data buses. Temporary storage of data is available to microprocessor 126 in a random access memory (RAM) 128, which is connected to the microprocessor through address/data lines 130. Similarly, data constants and program instructions are stored in a read only memory (ROM) 132, connected to the microprocessor via address/data lines 134.

Direct interconnection between electronic engine control channel (1) 38 and electronic engine control channel (2) 40 may optionally be provided through leads 136, which are connected to an isolation circuit 138. Isolation circuit 138 may include, for example, a plurality of opto-isolators (not shown). Leads 140 are analogous to leads 136, connecting directly to the microprocessor in the other electronic engine control channel.

A lead 148 conveys signals from microprocessor 126 to an A to D converter 144, controlling its operation and the selection of sensor signals (for total pressure, static pressure, and total temperature) that are input to the A to D converter from a multiplexer 142. Multiplexer 142 is connected to A to D converter 144 via leads 146 and 150. Lead 150 carries a signal to multiplexer 142 that selects one of the sensor signals for A to D conversion. A clock lead 152 carries a signal that synchronizes the A to D converter with multiplexer 142.

In addition to the air data signals comprising total pressure, static pressure, and total temperature, other sensor signals may be input to multiplexer 142 for use by microprocessor 126 in carrying out control functions not directly related to air data. The sensor signals input to microprocessor 126 are thus provided from sensors connected to multiplexer 142 or via sensor DATAC buses 70, 72, and 74. Any sensors requiring excitation power are energized by a sensor excitation supply 154 over leads 156. Power for each of the components comprising electronic engine control channel (1) 38 (and the other electronic engine control channel) is provided from a power supply 158, which is energized by a separate, dedicated engine-driven power source (not shown) on the engine it controls.

Figure 3B:
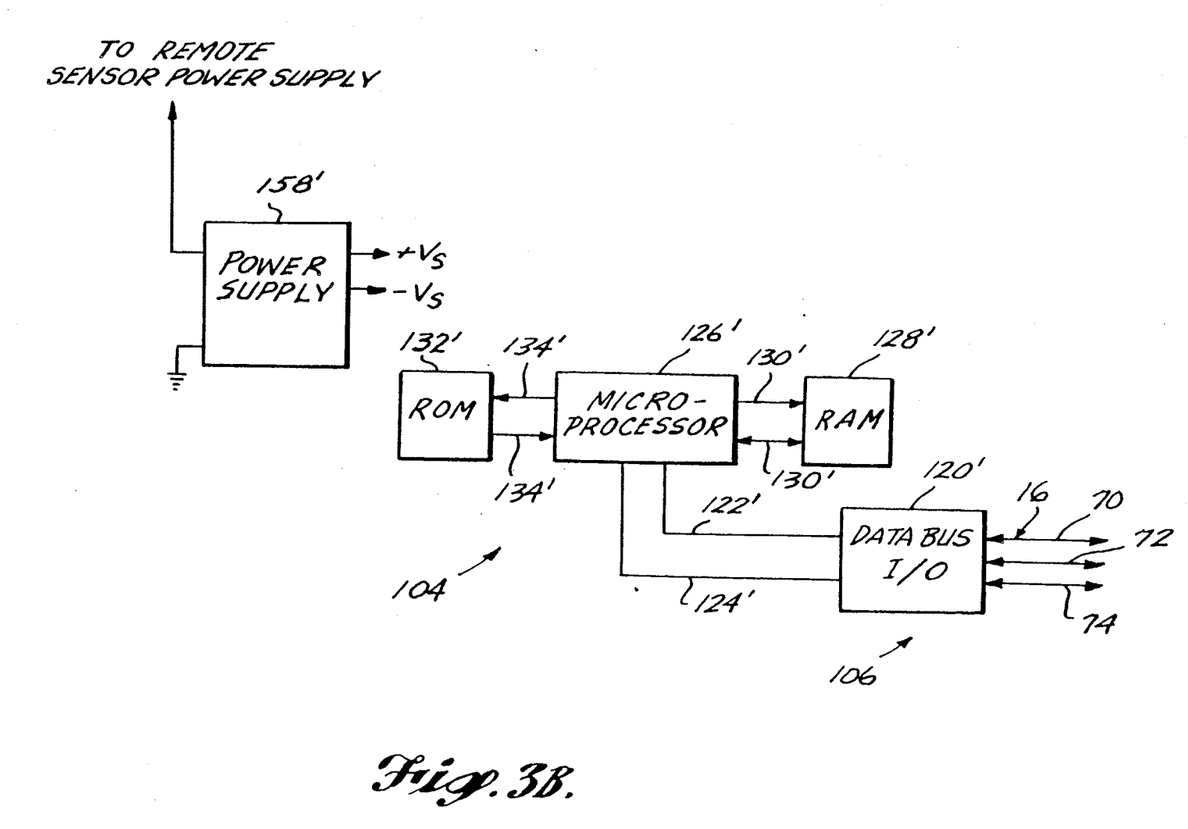
FIG. 3B is a schematic block diagram of the airframe air data system control.

In FIG. 3B, a block diagram illustrates the circuitry of one of the redundant processors 104 that comprise airframe air data units 18; the other processors 104 are substantially the same. Since many of the same components are used in processors 104 as in the electronic engine control channels, these components are identified by the same reference numerals, but include a prime superscript designation. Accordingly, sensor data indicative of total pressure, static pressure, and total temperature are provided each processor 104 through a data bus I/O circuit 120', which comprises data interface 106. Lines 124' and 126' convey data between a microprocessor 126' and the data bus I/O circuit. A RAM 128' and a ROM 134' are connected to microprocessor 126', respectively, by leads 130' and 134'. The various air data sensors 20, 22, 24, 26, 28, and 30 that are associated with the airframe air data system are provided excitation power from their own remotely disposed power supplies (not shown), which are connected to a power supply 158'. This power supply is energized by the aircraft's onboard line voltage.

The programmed instructions implemented by microprocessor 126' in selecting air data values for use by the airframe air data unit and by each channel of each of the electronic engine controls are stored in ROM 132', along with programmed instructions necessary to carry out other functions implemented by the airframe air data unit (or by the electronic engine control channels). Since the program stored in ROM 132' for selecting air data is replicated in the other processors 104 of the airframe air data units 18 and in ROM 132 in each of the electronic engine control channels (1) and (2), the total pressure, static pressure, and total temperature data used by the airframe air data unit and by each channel of the electronic engine controls are consistently selected according to common logic.

Figure 5A:
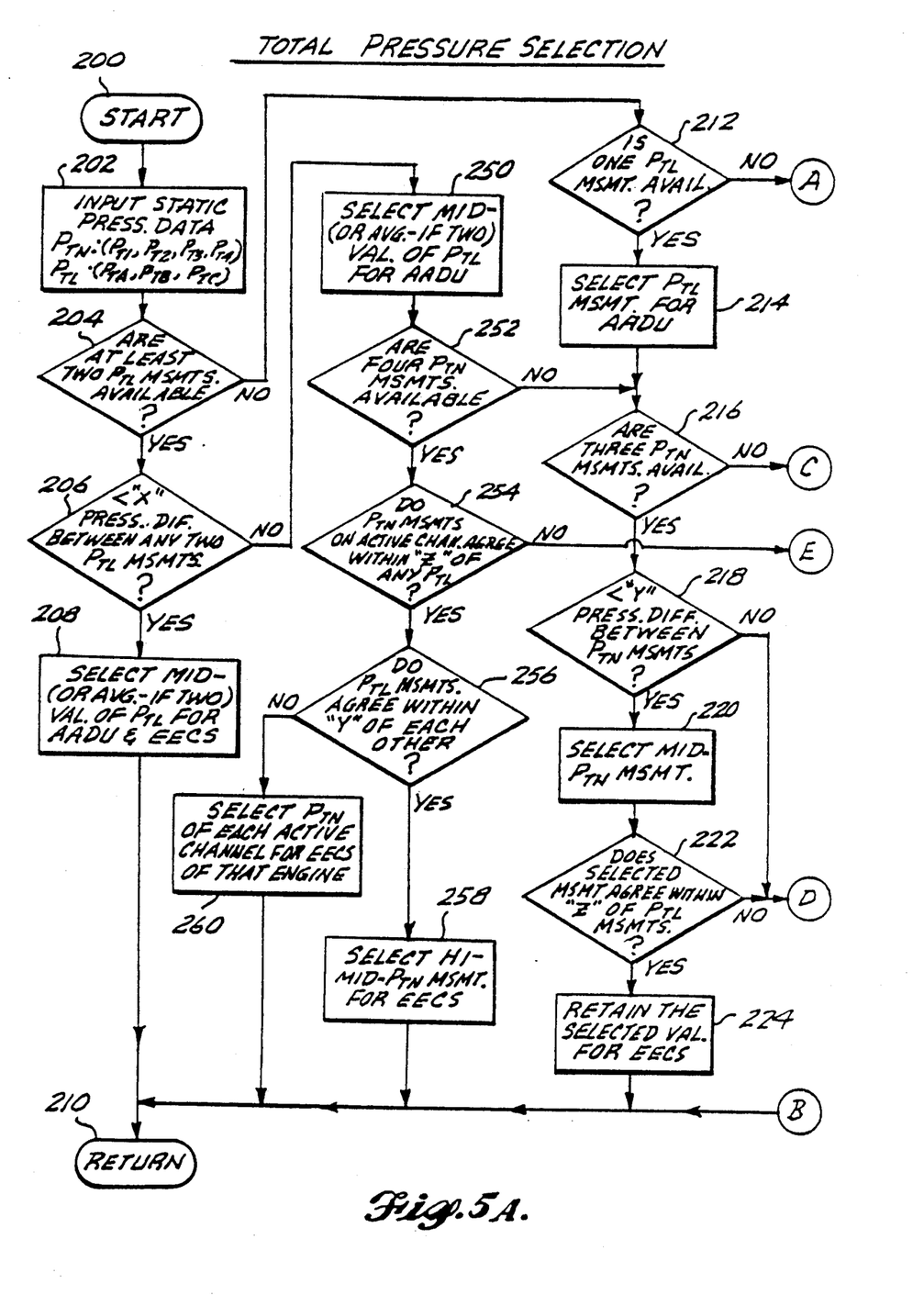
FIGS. 5A and 5B are a flow chart illustrating the logic used in selecting a total pressure signal.

The logic used to implement selection of a total pressure for use by airframe air data units 18 and by each of the electronic engine control channels is illustrated in FIG. 5, in the form of a flow chart, starting at a block 200 (FIG. 5A). With respect to the electronic engine control channels, in a block 202, microprocessor 126 reads digital data from A to D converter 144, and data provided on bidirectional data buses 16 and by selection of sensor signals input from the appropriate total pressure sensors. In processor 104, microprocessor 126' accesses the same data through data bus I/O 120'. To simplify the following explanation of the data selection logic, reference is made only to "the microprocessor," it being understood that this term refers to microprocessor 126 or 126', as appropriate--microprocessor 126 only selects sensor data for use by the electronic engine control system, and microprocessor 126' only selects sensor data for use by the airframe air data units.

Total pressure data from total pressure sensors 80, 82, and 84 are collectively referred to in the flow chart of FIG. 5A as $P_{TL}$, where the subscript "L" collectively represents any of the letters A, B, or C (see FIG. 2); the total pressure sensors disposed within the cowling of each of the left and right engines produce total pressure data represented collectively as $P_{TN}$. The subscript "N" represents data from any of the sensor inputs 42, 48, 58, and 64 for total pressure sensors disposed within the cowling of the right engine or left engine of the aircraft designated $P_{T1}$, $P_{T2}$, $P_{T3}$, and $P_{T4}$, respectively (see FIG. 1). In block 202, each of the available data for total pressure are input to the microprocessors, so that they can select a value for total pressure that will be used in carrying out the functions implemented either by each of the electronic engine control systems (EECS) 34, 36, or by airframe air data units (AADU) 18, depending on which microprocessor 126 or 126' is making the selection.

In a block 204, the microprocessor determines if there are at least two $P_{TL}$ measurements available. It should be noted that total pressure sensors 80, 82, and 84 are more accurate than the total pressure sensors disposed on each of the engines and thus provide data that are preferred for use by both airframe air data units 18 and by electronic engine controls 34 and 36. If at least two of the airframe total pressure measurements are available, in a decision block 206, the microprocessor determines whether the difference between any of the two total pressure measurements on the airframe are less than a predetermined value "X". In the preferred embodiment, the value of X is 0.016 inches of mercury; however, other values may be selected as appropriate for the particular total pressure sensors and the application.

In a block 208, assuming an affirmative response to the inquiry of decision block 206, the microprocessor selects the mid-value of the three airframe total pressure measurements, and if only two airframe total pressure measurements are available, selects an average value for use by both the AADU and each EECS. Thereafter, in a block 210, the program returns to block 200 (or to a reentry point in some other program from which total pressure selection has been called as a subroutine). The value for total pressure is normally selected as described above. However, if more than two of the total pressure sensors 80, 82, and 84 on the airframe should fail, in block 204, the program diverts to a decision block 212 in which it is determined whether one of the airframe total pressure measurement is available. If one of these measurements is available, in a block 214, the microprocessor selects that total pressure measurement for use by the AADU, and then proceeds to a decision block 216.

In decision block 216, a check is made to determine if at least three of the total pressure measurements from the sensors on the left and right engines are available. If so, in a decision block 218, the microprocessor determines if the pressure difference between the electronic engine control total pressure measurements is less than a predetermined value "Y". In the preferred embodiment, Y is 0.20 inches of mercury; however, other values may be used. The purpose of decision block 218 is to check for excessive differences between the available EECS total pressure measurements, which might indicate that one or more of those measurements are in error. If the total pressure measurements checked in decision block 218 agree within the Y pressure difference, in a block 220, the microprocessor selects the mid-value total pressure measurement from the EECS (or the high-mid-value total pressure measurement, if four such measurements are available).

In a decision block 222, the program checks to determine if the selected measurement agrees within a predetermined value "Z" of the airframe total pressure measurements. If so, the selected value is retained for use in the electronic engine control system in a block 224. Thereafter, the program proceeds to block 210.

Figure 5B:
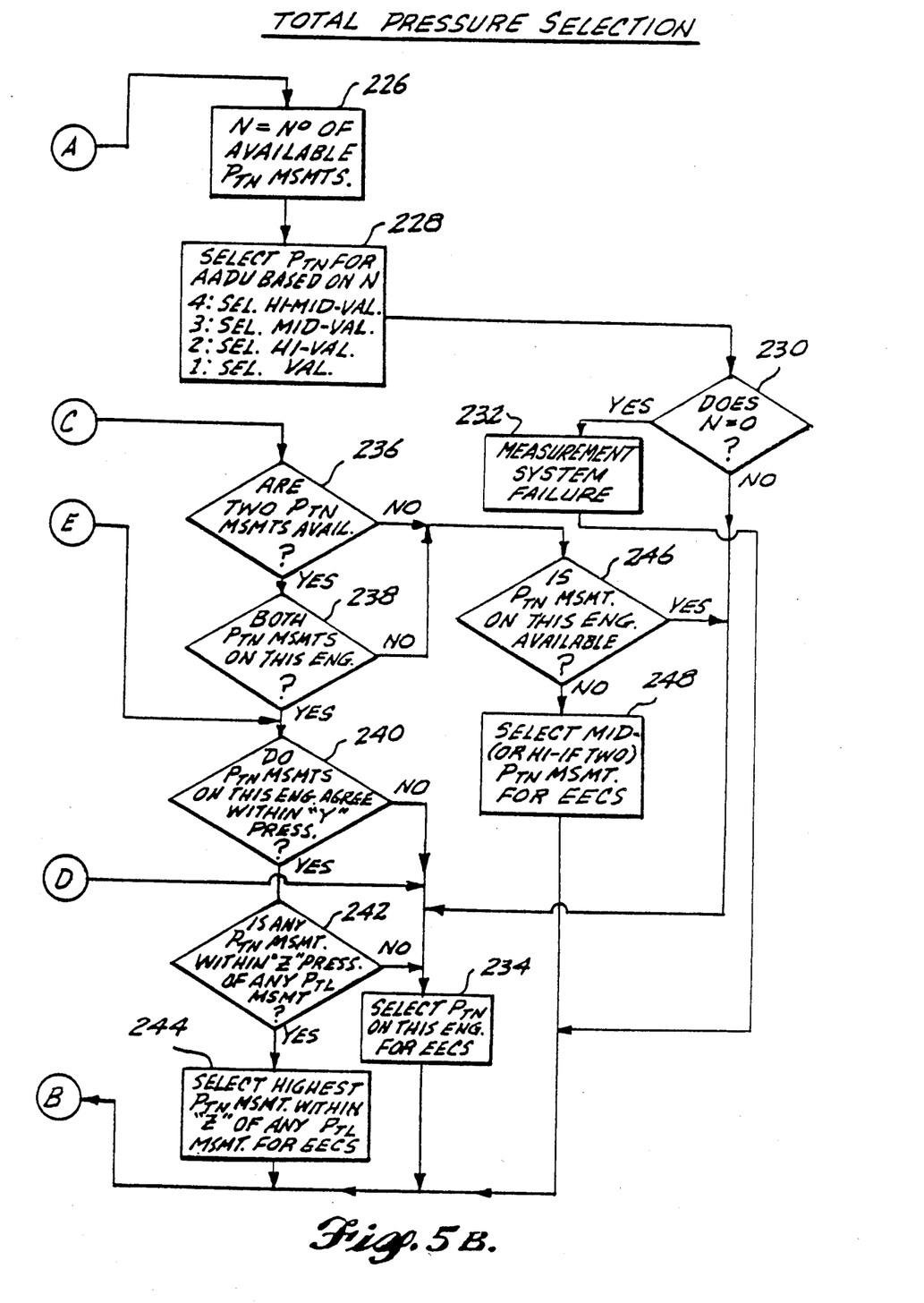

Referring back to decision block 212, if at least one airframe total pressure measurement is not available, the program proceeds to a block 226 in FIG. 5B. In block 226, a variable "N" is set equal to the number of available EECS total pressure measurements, and in a block 228, the microprocessor selects the total pressure value from those measurements for use by the AADU, based on the value of N. In a decision block 230, a check is made to determine if N is equal to 0, in which case, it is apparent that all sensors indicative of total pressure have failed. In the unlikely event that N equals 0, microprocessor 126 defaults to a total pressure measurement system failure condition in a block 232. Thereafter, the program advances to block 210 on FIG. 5A.

Assuming that N is not equal to 0 in decision block 230, the program proceeds to a block 234 wherein each electronic engine control system 34 or 36 selects the total pressure measurement for its own active electronic engine control channel for use with that engine. It will be understood that only one of the electronic engine control channels (1) and (2) for each engine has priority to control the operation of that engine; should channel (1) fail, the other channel gains control priority by default. Although the selection logic implemented by block 234 may not provide the most accurate pressure value for an engine, at worst, no more than one engine is adversely affected.

Referring back to decision block 216, if three EECS total pressure measurements are not available, the program proceeds to a decision block 236 in FIG. 5B, to consider whether two total pressure measurements are available from the two EECSs. If so, in a decision block 238, the microprocessor determines whether both of the total pressure measurements are provided by sensors on the engine making the selection. If the answer is affirmative, in a decision block 240, the microprocessor determines if the two total pressure measurements from the sensors on this engine agree within the predetermined value Y. Assuming that they do, in a decision block 242, the program determines if any of the total pressure measurements from the EECS agree within a predetermined value Z of any of the total pressure measurements from the AADU. In the preferred embodiment, Z is equal to 0.20 inches of mercury, but other values may be chosen, as appropriate. Assuming that such agreement exists, in a block 244, the microprocessor selects the highest total pressure measurement that is within the value Z of any of the total pressure measurements of the AADU for use by each EECS.

Referring back to decision block 236, if less than two total pressure measurements are available from the two EECSs, in a decision block 246, the program determines if a total pressure measurement is available from the EECS for the engine control channel making the selection, and if so, proceeds to block 234. Otherwise, the program proceeds to a block 248 in which the mid-value total pressure measurement from the EECS sensors, or the higher, if two such measurements are available, is selected for use by the EECS.

If the response to either decision blocks 240 or 242 is negative, the microprocessor selects the total pressure measurement available on the engine for the control making the selection, as indicated in block 234. This action is also taken if the result of either decision block 218 or decision block 222 is negative.

Referring now to decision block 206, if the pressure difference between any two total pressure measurements made on the airframe air data unit is greater than X, the program proceeds to a block 250 wherein the microprocessor selects the mid-value of three airframe total pressure measurements for use by the AADU, or the average value, if only two such measurements are available. In a decision block 252, a check is made to determine if four total pressure measurements are available from the two EECSs. If so, in a decision block 254, the program determines if the total pressure measurements on the channel agrees within Z of any total pressure measurement on the AADU. Assuming that the response is affirmative, in a decision block 256, the program determines if the total pressure measurements from the AADU agree within Y of each other. If so, in a decision block 258, the program causes selection of the high-mid-value total pressure measurement from the EECSs for use by each of the engines controls. Thereafter, the program proceeds to block 210.

Referring back to decision block 252, if less than four total pressure measurements are available from the two EECSs, the program proceeds to decision block 216, with the results already explained above. Further, in decision block 254, if the total pressure measurements on the active electronic engine control channel of the engine do not agree within Z of any of the total pressure measurements from the AADU, the program proceeds to decision block 240 on FIG. 5B, again with the results described above.

A negative response in decision block 256 causes the microprocessor to select a total pressure measurement on each of the active channels for the value used by the EECS to control that engine, as indicated in a block 260. Thereafter, the program proceeds to block 210.

From the above description of the logic implemented in the selection of total pressure, it will be apparent that preference is given to selecting one of the total pressure measurements from the AADU for use both by the airframe air data system and by each EECS. Only if the AADU total pressure measurements are unavailable or differ significantly from each other does each EECS select one of the total pressure measurements from its sensors for use by that EECS; the AADU continues to give preference to the total pressure measurements from its sensors, if available. If total pressure measurements are not available from the airframe air data system, then the AADU uses one of the total pressure measurements from the EECSs. If an AADU total pressure measurement is not used or is not available, an EECS channel either uses the "best" available EECS measurement, if there is close agreement between the available measurements, or the measurement for the channel making the selection.

Figure 6A:
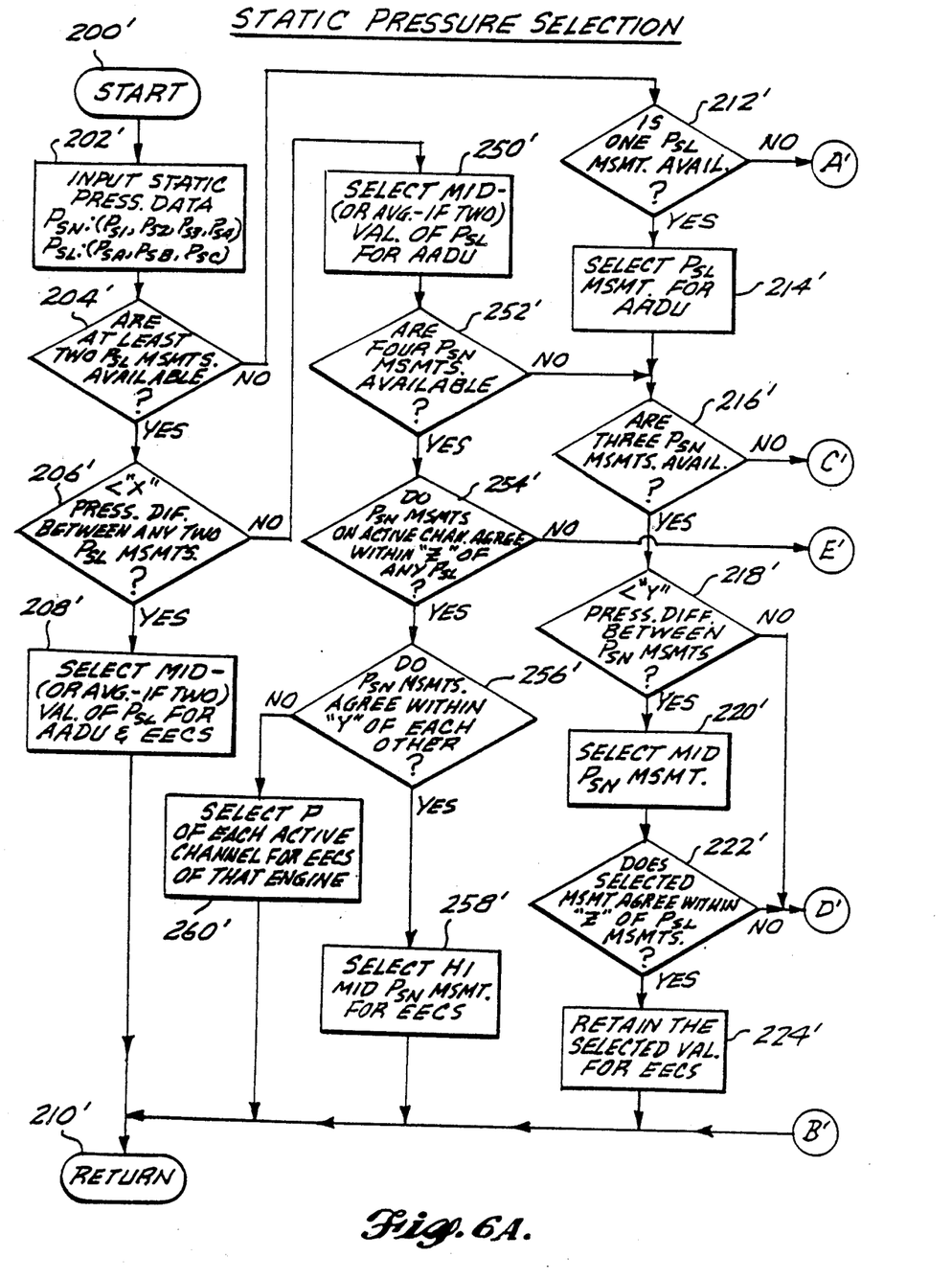
FIGS. 6A and 6B are a flow chart illustrating the logic used in selecting a static pressure signal.
Figure 6B:
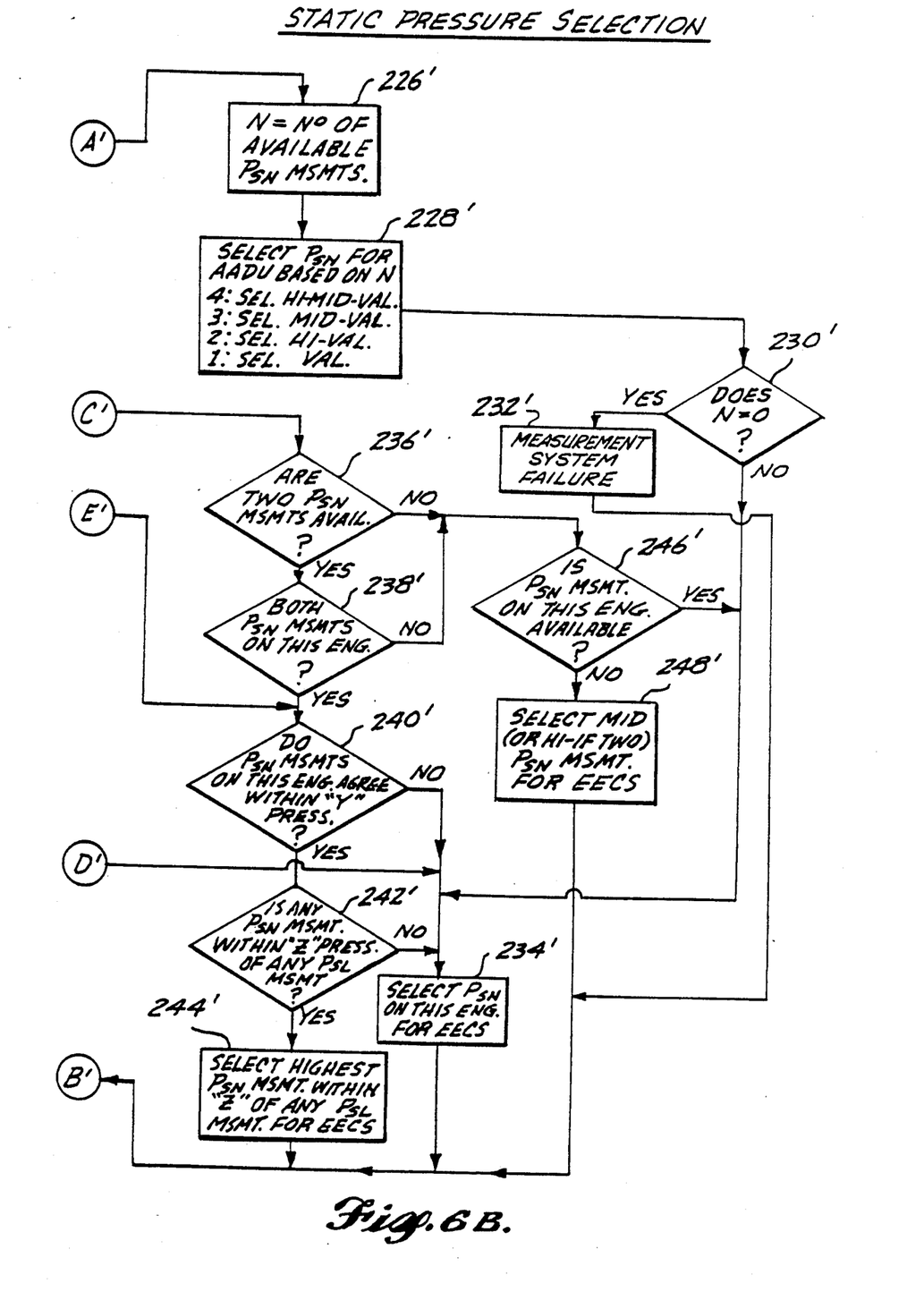

By comparing FIGS. 5 and 6, it will be evident that substantially the same logic is used in selecting the static pressure for use by the AADU and EECS, as is used in the selection of the total pressure. Accordingly, in FIG. 6, the same reference numerals from FIG. 5 are used to represent each block of the flow chart; however, these reference numbers include a prime mark to indicate that they represent the logic used in selecting a different parameter. Since the same logic is used in selecting static pressure, it should not be necessary to repeat the explanation already provided for selection of a value for total pressure. Consistent with the designations used above, static pressure measurements made by sensors associated with an EECS are designated collectively as "$P_{SN}$", to identify any of the static pressure sensor signals $P_{S1}$, $P_{S2}$, $P_{S3}$, and $P_{S4}$ provided respectively by static pressure sensor inputs 44, 50, 60, and 66. Similarly, "$P_{SL}$" collectively represents the static pressure measurements associated with the AADU, indicative of any of the static pressures $P_{SA}$, $P_{SB}$, and $P_{SC}$ provided by static pressure sensors pressure sensors 86, 90, and 94, respectively.

Figure 4A:
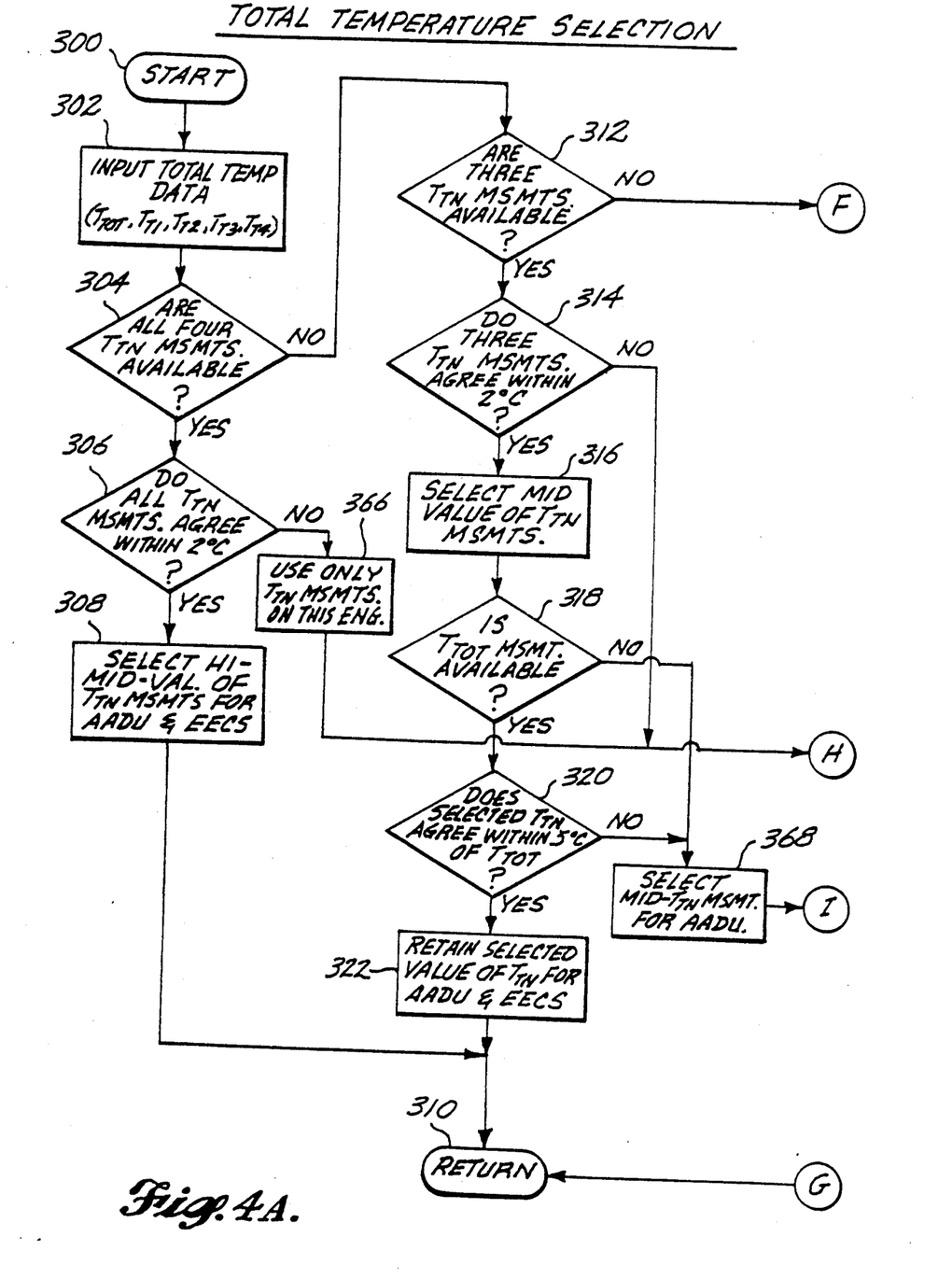
FIGS. 4A and 4B are a flow chart illustrating the logic used by the air data system in selecting a total temperature signal.

Selection of total temperature is implemented according to the logic shown in the flow chart of FIG. 4. The program starts at a block 300 and proceeds to a block 302, wherein the microprocessor causes the total temperature data to be input to the microprocessor. Total temperature for the AADU is identified by "$T_{TOT}$" while total temperature values provided by the total temperature sensors associated with the EECSs are collectively referenced by "$T_{TN}$", representing the values $T_{T1}$, $T_{T2}$, $T_{T3}$, and $T_{T4}$, respectively provided by total temperature sensor inputs 46, 52, 62, and 68.

In a decision block 304, the program determines whether all four $T_{TN}$ measurements are available from the two EECSs and, if so, determines in a decision block 306 whether the measurements agree within 2° C. of each other. Assuming that the measurements agree within this range, in a block 308, the microprocessor selects the high-mid-value of the $T_{TN}$ measurements for use by both the AADU and each EECS. Thereafter, the program proceeds to a block 310 for return to the calling program.

Referring back to decision block 304, if all four $T_{TN}$ measurements are not available, the logic proceeds to a decision block 312, which determines if three total temperature measurements are available from the two EECSs. If so, in a decision block 314, the logic determines whether the three total temperature measurements agree within 2° C. of each other. If they do, in a block 316, the microprocessor prospectively selects the mid value of the $T_{TN}$ measurements for use by both the AADU and each EECS.

In a decision block 318, the microprocessor determines whether the $T_{TOT}$ measurement is available. If it is, in a decision block 320, the microprocessor determines whether the selected $T_{TN}$ measurement agrees within 5° C. of the $T_{TOT}$ measurement. Assuming an affirmative response to this inquiry, in a block 322, the selected value of $T_{TN}$ (from block 316) is used for both the AADU and each EECS. The program then proceeds to return block 310.

Figure 4B:
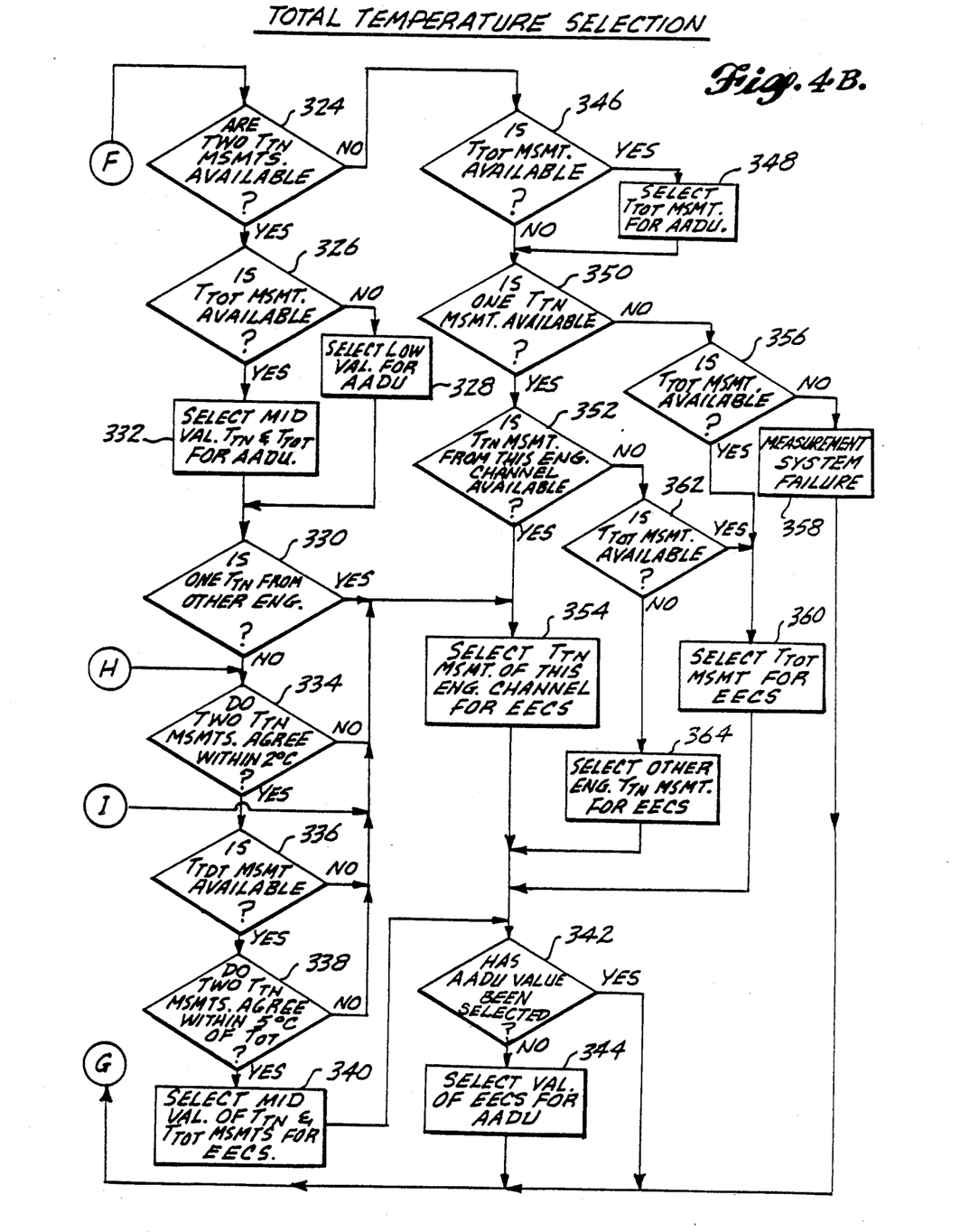

Referring back to decision block 312, if three total temperature measurements are not available from the EECSs, the program proceeds to a decision block 324 in FIG. 4B, to determine if two of the total temperature measurements are available from the EECSs. If so, in a decision block 326, the program determines if the total temperature measurement from the AADU is available and, if so, selects the mid-value of the available total temperature measurements for use by the AADU, in a block 332. If the total temperature measurement is not available from the AADU, in a block 328, the program selects the lower value of the two $T_{TN}$ measurements for use by the AADU.

In a decision block 330, the program determines whether one of the two available $T_{TN}$ total temperature measurements is from a total temperature sensor disposed on the other engine. If not, in a decision block 334, a check is made to determine whether the $T_{TN}$ measurements agree within 2° C. Assuming that they do, a decision block 336 determines whether the $T_{TOT}$ measurement is available, and if so, in a decision block 338, a check is made to determine if the two $T_{TN}$ measurements from the EECS agree within 5° C. of the $T_{TOT}$ measurement from AADU. Provided that such agreement exists, in a block 340, the mid-value of the available total temperature measurements is selected for use by each EECS.

Thereafter, the program proceeds to a decision block 342 to determine whether a total temperature value for the AADU has been selected. If not, in a block 344, the total temperature value selected for use by each EECS is also selected for use by the AADU. Thereafter, the program proceeds to return block 310.

Referring back to decision block 324, if two $T_{TN}$ measurements are not available from the EECSs, a check is made in a decision block 346 to determine if the $T_{TOT}$ measurement is available from the AADU. If so, in a block 348, the microprocessor selects the $T_{TOT}$ measurement for use by the AADU. Thereafter, or if the $T_{TOT}$ measurement is not available, the program proceeds to a decision block 350, in which the microprocessor determines if one $T_{TN}$ measurement is available from either EECS. If the answer is affirmative, in a decision block 352, a determination is made whether the $T_{TN}$ measurement from the engine making the selection is available. Assuming that is, in a block 354, the total temperature measurement for the engine channel having priority for controlling that engine is selected for use by the EECS on that engine. The program then proceeds to decision block 342, as previously described.

Referring to decision block 350, if at least one total temperature measurement is not available from the EECS making the decision, a decision block 356 determines if a $T_{TOT}$ measurement is available. Assuming that the airframe total temperature measurement is available, this value is selected for use by the EECS on that engine in a block 360. Thereafter, logic proceeds to decision block 342. If the $T_{TOT}$ measurement is not available in decision block 356, logically there is a total temperature measurement system failure, as indicated in a block 358, since none of the sensors are able to provide a measurement for total temperature.

Looking back to decision block 352, if the total temperature measurement from the channel having priority to control the engine and making the decision is not available, a decision block 362 determines if the total temperature measurement is available from the AADU, and if so, selects that value for use by the EECS in block 360. Otherwise, the program proceeds to a block 364 in which the total temperature measurement from the other engine is used for the EECS. Thereafter, the program again proceeds to decision block 342.

Should the total temperature measurements from the EECSs fail to agree within 2° C. in decision block 306, the program proceeds to a block 366, which provides that only the $T_{TN}$ measurements on an engine for the channel making the selection can be used for total temperature in controlling that engine. The program then proceeds to decision block 334, as already described. A branch to decision block 334 also occurs, should the inquiry in decision block 314 result in a negative response.

A negative response to the inquiry of decision block 318 results in a branch to a block 368, which provides for selecting the mid-value total temperature measurement of all the available $T_{TN}$ measurements from the EECSs for use by the AADU. Thereafter, the program proceeds to block 354 in FIG. 4B, as previously described. Block 368 is also in the path for the flow of logic from decision block 320, if the selected EECS total temperature measurements do not agree within 5° C. of $T_{TOT}$.

In reviewing the logic used to select total temperature, it should be apparent that one of the $T_{TN}$ measurements from the EECS sensors is selected in preference to the $T_{TOT}$ measurement associated with the AADU for use by both systems, unless the EECS total temperature measurements do not agree within 2° C. of each other. The reason for this preference is that the total temperature indicated by the sensors on the engines is more accurate when the aircraft is moving through the air than that indicated by total temperature sensor 98 on the airframe. Each of the total temperature sensors on the engines are better disposed to sense dynamic or kinetic temperature associated with air flowing into disposed to sense dynamic or kinetic temperature associated with air flowing into the engine than is total temperature sensor 98. If there is significant disagreement between the total temperature sensors associated with the EECSs, the logic gives preference to the total temperature associated with the engine of the channel having priority in making the selection.

Overriding importance in the preceding selection logic for total pressure, static pressure, and total temperature is given to maintaining engine-to-engine independency for failures of any of the air data sensors, which might cause loss of engine thrust. For any air data parameter, no single failure of a sensor resulting in an incorrect measurement of total pressure, static pressure, or total temperature, nor any combination of failures of different sensors (except similar failures occurring independently on each engine) should result in incorrect measurements being used for that parameter or in any undesired effect on more than one engine. Under normal circumstances, where all sensors are properly operating, both the AADU and the EECSs use the same respective values for each of these three air data parameters, thereby ensuring that consistent data are used by both systems. If conditions or sensor data errors or faults do not permit a common value to be used for any parameter by both the AADU and EECSs, the programmed logic provides for selection of the best available value for carrying out the above-described functional design goals of integrated air data system 10.

While the present invention has been described with respect to a preferred embodiment, those of ordinary skill in the art will appreciate that modifications may be made thereto within the scope of the claims that follow. Accordingly, it is not intended that the scope of the invention be in any way limited by the preceding description of the preferred embodiment, but instead that it be determined solely by reference to the claims.

The embodiments of the invention in which an exclusive property or privilege is claimed are defined as follows:

1. On an aircraft, an integrated air data system comprising:
   (a) a plurality of first sensors associated with an airframe air data unit, said first sensors each providing a signal indicative of a parameter used by the airframe air data unit to determine the flight status of the aircraft;
   (b) a plurality of second sensors associated with an engine control system, said second sensors each providing a signal indicative of a parameter used by the engine control system to control the operation of an aircraft engine, the signals provided by said second sensors being redundant to the signals provided by said first sensors, the same parameter being sensed by at least one each of the first and second sensors;

(c) a bidirectional data bus connecting the airframe air data unit to the engine control system and operative to convey data bidirectionally therebetween;

(d) control means, disposed within both the airframe air data unit and the engine control system, and connected to the data bus, for selecting at least one of the redundant signals provided by the first and second sensors as a preferred signal for use by the airframe air data unit and the engine control system according to a predetermined logic that gives priority to using the same signal for both the airframe air data unit and the engine control system, and minimizes the effect of a failure of any one or more of the first and second sensors.

2. The integrated air data system of claim 1, wherein the first sensors comprise a plurality of total pressure sensors, a plurality of static pressure sensors, and a total temperature sensor.

3. The integrated air data system of claim 2, wherein the second sensors comprise a plurality of total pressure sensors, a plurality of static pressure sensors, and a plurality of total temperature sensors.

4. The integrated air data system of claim 3, wherein the engine control system includes a first and a second channel, each channel including inputs from at least one of the total pressure sensors, from at least one of the static pressure sensors, and from at least one of the total temperature sensors comprising the second sensors, one of the first and second channels having priority to control an aircraft engine in response to the selected signals.

5. The integrated air data system of claim 4, wherein the total pressure and static pressure sensors comprising one of the first sensors and the second sensors are more accurate, the logic followed by said control means giving preference to selecting signals provided by said one of the total pressure and static pressure sensors, rather than corresponding redundant signals provided by the other of said first and second sensors.

6. The integrated air data system of claim 4, wherein the logic followed by said control means gives preference to selecting one of the signals provided by the total temperture sensors rather than the other corresponding redundant signal.

7. The integrated air data system of claim 4, wherein the control means are further operative to determine differences between selected redundant signals for comparison to predetermined values in selecting which of the corresponding redundant signals indicative respectively of total pressure, static pressure, and total temperature will be used by the airframe air data unit and the engine control system.

8. On an aircraft having at least one engine controlled by an engine control system in response to air data signals, and including an airframe air data unit for determining flight status information in response to air data signals, said air data signals being indicative of total pressure, static pressure, and total temperature, an integrated air data system comprising:

(a) a first total pressure sensor disposed in proximity to an airframe of the aircraft, connected to provide a signal indicative of total pressure to the airframe air data unit;

(b) a second total pressure sensor disposed in proximity to said at least one engine, connected to provide a signal indicative of total pressure to the engine control system;

(c) a first static pressure sensor disposed in proximity to the airframe, connected to provide a signal indicative of static pressure to the airframe air data unit;

(d) a second static pressure sensor disposed in proximity to said at least one engine, connected to provide a signal indicative of static pressure to the engine control system;

(e) a first total temperature sensor, disposed in proximity to the airframe, connected to provide a signal indicative of total temperature to the airframe air data unit;

(f) a second total temperature sensor, disposed in proximity to said at least one engine, connected to provide a signal indicative of total temperature to the engine control system, corresponding signals provided by the first total pressure, static pressure, and total temperature sensors being generally redundant to those respectively provided by the second total pressure, static pressure, and total temperature sensors;

(g) means for bidirectionally conveying the signals indicative of total pressure, static pressure, and total temperature between the airframe air data unit and the engine control system; and (h) signal selection means, associated with both the airframe air data unit and the engine control system, for selecting one each of the corresponding redundant signals provided respectively by the first and second total pressure, static pressure, and total temperature sensors, for use by the airframe air data unit and the engine control system, said signal selection means including predetermined logic means for determining a preferred one of said respective redundant signals for said selection, failure of one or more of said first and second sensors having a minimal impact on the operation of the airframe air data unit and the engine control system.

9. The integrated air data system of claim 8, wherein the aircraft includes a plurality of engines for propelling the aircraft, each engine being controlled by an engine control system.

10. The integrated air data system of claim 9, wherein the engine control system comprises a plurality of channels associated with each engine, each channel being connected to receive the signals produced by the first and the second total pressure, static pressure, and total temperature sensors, and wherein one of the channels has priority to control operation of the engine with which it is associated.

11. The integrated air data system of claim 10, further comprising a plurality of second total temperature sensors, wherein the signal selection means are further operative to determine whether the total temperatures indicated by any available second total temperature sensors agree within a predefined value in selecting said preferred one of the total temperature signals.

12. The integrated air data system of claim 11, wherein the signal selection means are further operative to use the total temperature indicated by the first total temperature sensor in selecting said preferred signal, if signals from less than all the second total temperature sensors are available.

13. The integrated air data system of claim 10, wherein the first total pressure and static pressure sensors are more accurate than the second total pressure and static pressure sensors, said signal selecting means being operative to give priority to selecting the signals produced by the first total pressure sensor and by the first static pressure sensor over signals produced by the corresponding respective second total and static pressure sensors.

14. The integrated air data system of claim 13, further comprising a plurality of first total pressure sensors, wherein if all the first total pressure sensors have failed, said signal selecting means are operative to select the second total pressure sensor signal of the channel having priority, for use in controlling the engine.

15. The integrated air data system of claim 13, further comprising a plurality of first static pressure sensors, wherein if all the first static pressure sensors have failed, said signal selecting means are operative to select the second static pressure sensor signal in controlling the engine.

16. The integrated air data system of claim 14, wherein the signal selecting means are operative to determine whether differences between the total pressures indicated by the plurality of first total pressure sensors are excessive by comparison with a predefined value in selecting said preferred total pressure signal.

17. The integrated air data system of claim 8, further comprising a plurality of first static pressure sensors, wherein the signal selecting means are operative to determine whether differences between the static pressures indicated by the plurality of first static pressure sensors are excessive by comparison with a predefined value in selecting said preferred static pressure signal.

18. The integrated air data system of claim 14, further comprising a plurality of second total pressure sensors, wherein the signal selecting means are operative to determine whether differences between the total pressures indicated by the plurality of second total pressure sensors are excessive by comparison with a predefined value in selecting said preferred total pressure signal.

19. The integrated air data system of claim 17, further comprising a plurality of second static pressure sensors, wherein the signal selecting means are operative to determine whether differences between the static pressures indicated by the plurality of second static pressure sensors are excessive by comparison with a predefined value in selecting said preferred static pressure signal.

20. The integrated air data system of claim 18, wherein the signal selecting means are operative to determine whether differences between the total pressure indicated by an available first total pressure sensor and the total pressure indicated by at least one of the second total pressure sensors are excessive by comparison with a predefined value in selecting said preferred total pressure signal.

21. The integrated air data system of claim 19, wherein the signal selecting means are operative to determine whether differences between the static pressure indicated by an available first static pressure sensor and the static pressure indicated by at least one of the second static pressure sensors are excessive by comparison with a predefined value in selecting said preferred static pressure signal.

22. The integrated air data system of claim 10, wherein the signal selecting means are operative to select different total temperature signals, total pressure signals, and static pressure signals to control each engine if the accuracy of the corresponding sensors producing the air data signals is not uncertain, so that erroneous air data signals are less likely to affect all engines.

* * * * *